Patented Nov. 30, 1937

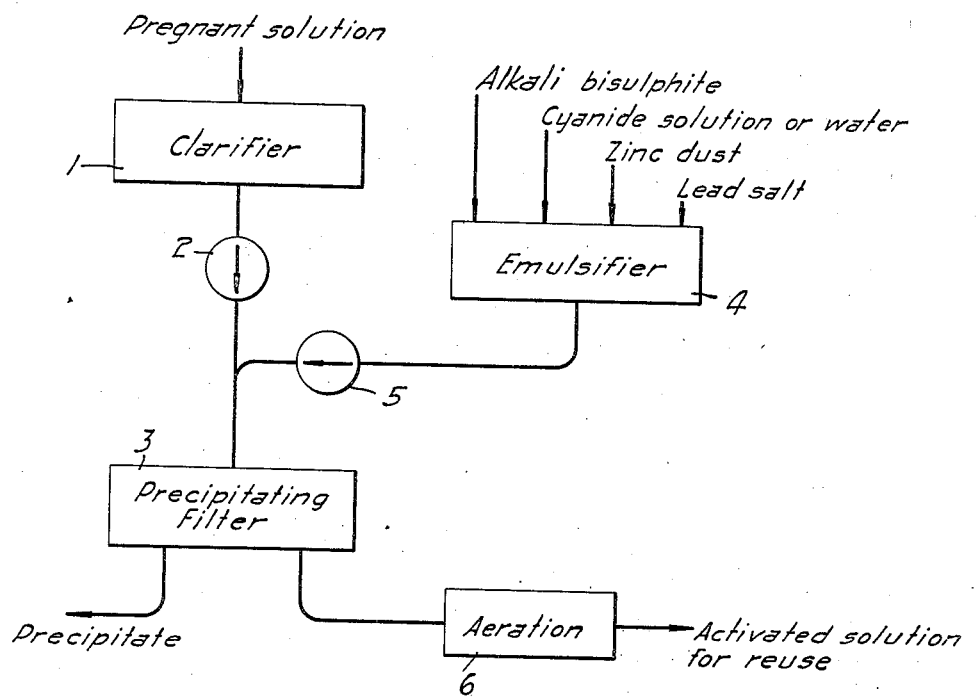
INVENTORS
LOUIS D. MILLS
THOMAS B. CROWE
JOYE C. HAUN

2,100,865

UNITED STATES PATENT OFFICE 2,100,865

CYANIDE PROCESS

Louis D. Mills and Thomas B. Crowe, Palo Alto and Joye C. Haun, San Francisco, Calif., assignors to The Merrill Company, San Francisco, Calif., a corporation of California Application June 3, 1935, Serial No. 24,596

7 Claims. (Cl. 75—107)

This invention relates generally to the treatment of alkaline cyanide solutions, such as are employed to dissolve gold and/or silver from precious metal bearing ores to effect precipitation of dissolved precious metals from the same.

It is an object of the invention to effect improvements in existing methods for the precipitation of cyanide solutions such as referred to above, by a relatively simple and inexpensive treatment which will serve to insure complete absence of dissolved oxygen immediately preceding and during the precipitation operation. The presence of dissolved oxygen in the solution, while the solution is being contacted with a metallic precipitant like zinc dust, is known to be detrimental to efficient precipitation; in fact, complete precipitation cannot take place until all free oxygen is removed or rendered inactive. Up to the present time it has been virtually universal practice to remove a portion of the dissolved oxygen prior to contact with a metallic precipitant, by mechanical deoxidation. In carrying out this mechanical deoxidation, the cyanide solution is subjected to the action of a partial vacuum, while in the form of films or streams, whereby oxygen and other dissolved gases are dispersed to a degree proportional to the reduction in pressure. This treatment does not remove all of the dissolved oxygen; in average practice the removal ranges from 85% to 90%, the remaining oxygen being subsequently rendered inactive at the expense of the precipitant employed, usually metallic zinc. This method of disposing of the last traces of free oxygen is not only inefficient, owing to wasteful evolution of hydrogen, but also forms deleterious by-products, such as basic zinc hydrate, which tend to clog the precipitate filters and which also coat the particles of zinc, rendering them inefficient as precipitants for the metals to be recovered. The present process, on the other hand, is characterized by the use of a chemical reducing agent which not only combines with and renders inactive all of the remaining traces of dissolved oxygen, but also, because of its solvent power, cleanses and activates the precipitant, without, however, materially altering the alkalinity of the pregnant cyanide solution, and without detrimentally affecting its solvent power for the precious metals.

A further object of the invention is to provide a process particularly applicable where zinc is employed as a precipitant. As will be presently explained, zinc is used not only as a precipitant for the metals to be recovered, but also for the purpose of providing a reacting medium to form a reducing agent which will exist in the presence of alkalinity and which will effectively remove or combine with dissolved oxygen.

A further object of the invention is to provide a novel procedure for contacting the zinc precipitant with a soluble lead salt for uniformly coating the zinc particles with lead, which will result in a highly active precipitant, without the possibility of clogging certain parts of the mechanical equipment as now frequently happens.

Another object of the invention is to provide a process which can be practised without special equipment and which can be readily incorporated into existing cyanide precipitating systems.

Further objects of the invention will appear from the following description in which the preferred embodiments of the invention have been set forth in detail in conjunction with the accompanying drawing.

Referring to the flow sheet shown in the accompanying drawing, one manner in which the present invention can be practised is as follows:— Cyanide solution containing dissolved precious metals (which has been termed pregnant cyanide solution) is first clarified, as by means of a vacuum clarifying filter 1. From the clarifying filter 1 the solution is shown being delivered by pump 2 to the precipitating filter 3. The precipitating filter may vary in construction; for example, it may be in the form of a pressure filter or it may be of the submerged vacuum leaf type.

The zinc dust employed as a precipitant is fed at a controlled rate to an emulsifier 4, where it is intermixed with cyanide solution or mill water to form what is commonly termed a zinc emulsion. Following customary practice, if cyanide solution is employed in place of mill water, it may be available solution after precipitation of metals from the same (i. e., barren solution) or a minor part of the pregnant solution. The zinc emulsion is shown being introduced at a controlled rate, by means of pump 5, into the flow of pregnant alkaline cyanide solution, at a point between pump 2 and precipitating filter 3. Where use of a filter of the vacuum leaf type is desired, the pump 5 may be omitted. In addition to the supply of cyanide solution or water, and zinc dust, to the emulsifier 4, the emulsifier is supplied with an alkali bisulphite, such as sodium or calcium bisulphite, and with a suitable soluble lead salt such as lead acetate or lead nitrate. These reagents are likewise introduced at a controlled rate, dependent upon the character and quantity of cyanide solution being treated. Assuming that alkaline cyanide solution, rather than fresh water, is being employed in the emulsifier 4, sufficient bisulphite must be employed to neutralize alkalinity of the solution and to afford an excess of the bisulphite in free solution.

The process described above operates as follows: Alkali bisulphites in neutral solution are capable of reacting with zinc to form strongly reducing compounds, such as alkali hydrosulphites. Thus, assuming that sodium bisulphite is employed, a reaction takes place with the zinc dust, in which sodium hydrosulphite is formed. A reaction also takes place between the lead salt and the sodium bisulphite, to form lead sulphite, which is substantially insoluble in the solution of the emulsion and which appears as a finely divided white precipitate. Both sodium bisulphite and sodium hydrosulphite are active reducing agents, and therefore all oxygen dissolved in the cyanide solution or water introduced into the emulsifier is effectively removed. Aside from incidental by-products of the reactions, which have no particular significance in the subsequent precipitating operation, the emulsion includes some remaining sodium bisulphite, and hydrosulphite, in solution, together with lead sulphite and zinc dust, in suspension. Only a relatively small amount of zinc is consumed in this reaction, leaving the main portion of the zinc to serve as a precipitant for the pregnant cyanide solution. Upon merging this mixture with the pregnant solution flowing into the precipitating filter 3, any remaining sodium bisulphite immediately reacts with the alkalinity of the pregnant solution. The hydrosulphite functions as an effective reducing agent, to completely remove dissolved oxygen from the pregnant solution, since an alkali hydrosulphite is capable of existing under conditions of alkalinity. The lead sulphite, upon contact with the alkaline pregnant solution, is immediately converted to soluble lead plumbite, and in its intimate association with the zinc particles causes a uniform coating of the zinc particles with metallic lead, which is known to be an effective aid in promoting efficient precipitation. Precipitation of the precious metals commences immediately upon introduction of the emulsion into the pregnant solution, and the precious metals are collected and precipitation completed upon the elements of the precipitating filter 3.

In most instances the filtrate or precipitated solution flowing from the filter 3 will be re-used for the extraction of gold and/or silver from additional ore or precious metal bearing deposits. To insure the absence of alkali hydrosulphite and other reducing by-products, and the presence of ample dissolved oxygen in the solution prior to its re-use, the filtrate from the precipitating filter 3 is shown being subjected to an aeration operation 6, which can be carried out by passing air through the solution, or by violent mechanical agitation in the presence of air, and which serves to oxidize the alkali hydrosulphite to form innocuous alkali sulphate. Since alkali hydrosulphite is readily amenable to oxidation to sulphate, its conversion by aeration can be carried out without difficulty. The amount of sulphate thus introduced into the solution is relatively small, in comparison with the quantity of alkali sulphate which exists in all cyanide solutions used in the treatment of ores.

Certain features and advantages of the process are as follows. Since the chemical treatment afforded enables complete deoxidation of the pregnant solution, it may follow mechanical deaeration to remove the remaining part of the dissolved oxygen, or, by the use of larger amounts of chemicals, mechanical deaeration can be omitted. The chemical treatment does not occur at the expense of the dissolving or extracting power of the solution after precipitation. Likewise, alkalinity of the pregnant solution, which in the usual cyaniding systems is afforded both by virtue of alkalinity of the sodium, potassium and/or calcium cyanides used in making up the solution, and by virtue of additions of protective lime, is not appreciably neutralized by the chemical treatment before precipitation, since only sufficient bisulphite is employed in the emulsifier to furnish a slight excess in free solution, to enable formation of the requisite small amount of hydrosulphite. In fact, alkalinity is altered only to a slight degree by reaction of alkalinity from the pregnant solution with unreacted or uncombined alkali bisulphite in the mixture supplied from the emulsifier, and by dilution with the neutral solution of the mixture. Thus, re-use of the precipitated solution need not be accompanied by excessive introduction of protective lime. In addition to causing complete removal of dissolved oxygen from the pregnant solution by formation and use of an alkali hydrosulphite, the reaction between zinc and alkali bisulphite in the emulsifier 4 serves to brighten the surfaces of the zinc particles by removing films of zinc oxide, thus placing the zinc in more effective and activated condition to receive a lead coating and to serve as a precipitant.

The formation of a substantially insoluble lead sulphite precipitate in the emulsifier 4, in place of the immediate formation of lead plumbite and a coating of metallic lead on the zinc, is a distinct advantage. In prior processes, where an emulsion has been formed by intermixing zinc dust with alkaline cyanide solution, together with a suitable amount of a soluble lead salt, and without the use of an alkali bisulphite, the lead salt is immediately converted to lead plumbite, and precipitation of metallic lead upon the zinc particles commences before the lead plumbite has been uniformly distributed throughout the mixture. As a result, the zinc particles are not uniformly coated, and the outlet from the emulsifier, in addition to the pumping equipment used for handling the emulsion and the pipe connections used with the pumping equipment, is subject to clogging. Such difficulties are entirely overcome with the present process, since the lead sulphite formed is thoroughly intermixed with the emulsion before introduction of the emulsion into the pregnant solution, and since the lead sulphite of itself can occasion no clogging.

Subject matter disclosed but not claimed herein, is claimed in co-pending Patent No. 2,039,656.

We claim:

1. In a process for the treatment of alkaline cyanide solution containing dissolved precious metals, to effect precipitation of the same, mixing zinc dust with alkali bisulphite in aqueous solution, whereby only a part of the zinc reacts with alkali bisulphite to form hydrosulphite, and then introducing the resulting mixture into the cyanide solution to be precipitated.

2. In a process for the treatment of alkaline cyanide solution containing dissolved precious metals, to effect precipitation of the same, mixing zinc dust with an aqueous solution containing an alkali bisulphite whereby only a part of the zinc reacts with alkali bisulphite to form hydrosulphite, causing the solution to be precipitated to flow to a precipitating filter, and then introducing the aforesaid mixture into the cyanide solution flowing to the precipitating filter, whereby the solution is deoxidized by the hydrosulphite and precipitated by the remaining zinc dust.

3. In a process for the treatment of alkaline cyanide solution containing dissolved precious metals, forming an emulsion of zinc dust together with lead sulphite, and then introducing the emulsion into the solution.

4. In a process for the treatment of alkaline cyanide solution containing dissolved precious metals, to effect precipitation of the same, intermixing zinc dust with an aqueous solution containing an alkali bisulphite and also with a soluble lead salt, whereby a part of the zinc reacts with alkali bisulphite to form a hydrosulphite and whereby the lead salt reacts with the alkali bisulphite to form substantially insoluble lead sulphite, and then introducing the mixture into the cyanide solution to be precipitated.

5. In a process for the treatment of alkaline cyanide solution containing precious metals dissolved from ores, to effect precipitation of the same, introducing into an aqueous solution containing an alkali bisulphite, zinc dust and also a soluble lead salt, causing the mixture so formed to be introduced into the cyanide solution to be precipitated, causing the cyanide solution after such introduction to flow through elements of a precipitating filter, and then oxidizing the filtrate from the precipitating filter to activate it for re-use in extracting precious metals from ores.

6. In a process for the treatment of alkaline cyanide solution containing dissolved precious metals, to effect precipitation of the same, mixing zinc dust with an aqueous solution of a sulphite salt, permitting a reaction to take place between the salt and a part of the zinc to form a hydrosulphite salt, and then introducing the resulting mixture into the alkaline cyanide solution to be precipitated.

7. In a process for the treatment of alkaline cyanide solution containing dissolved precious metals, to effect precipitation of the same, reacting a sulphite salt in aqueous solution with a metal to form a hydrosulphite, the amount of metal being greatly in excess of that required for the reaction, and then introducing the product of the reaction into the cyanide solution to be precipitated to effect deoxidation and precipitation of the same.

LOUIS D. MILLS.
THOMAS B. CROWE.
JOYE C. HAUN.